No. 12,597. REISSUED JAN. 15, 1907.
B. C. MAXWELL.
ACCOUNT CABINET.
APPLICATION FILED NOV. 10, 1906.
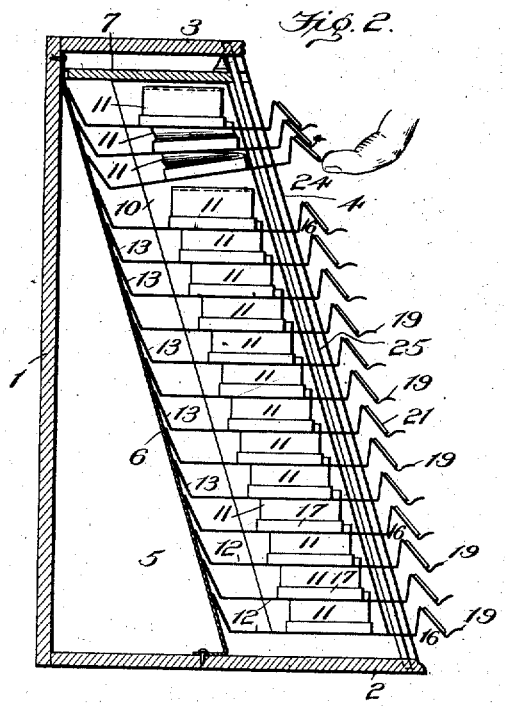
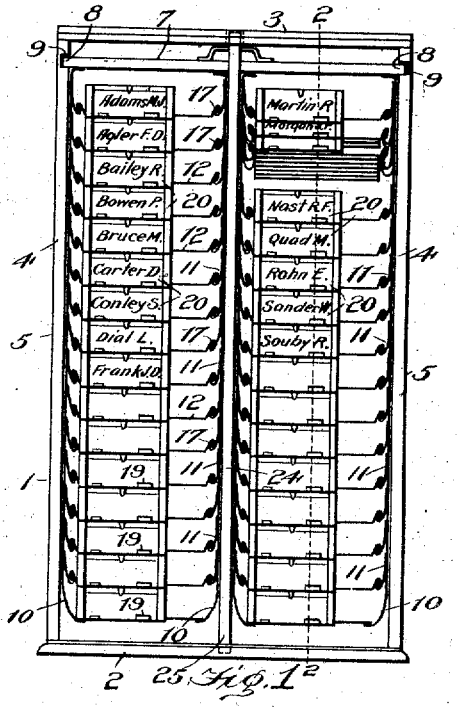
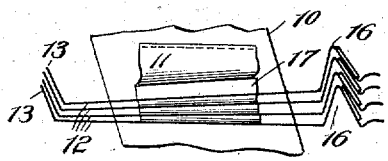
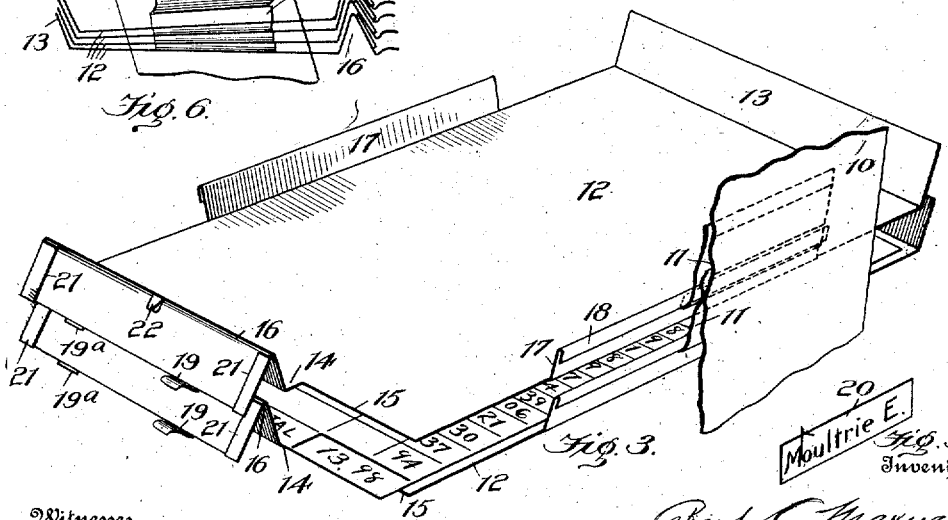
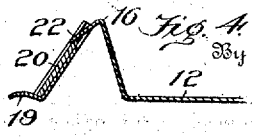
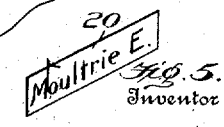
Witnesses
Edwin L. Bradford
P. H. Burch
Inventor
Bert C. Maxwell,
By
E. R. Alexander
Attorney

UNITED STATES PATENT OFFICE.

BERT C. MAXWELL, OF CANTON, OHIO.

ACCOUNT-CABINET.

No. 12,597. Specification of Reissued Letters Patent. Reissued Jan. 15, 1907.

Original No. 816,025, dated March 27, 1906. Application for reissue filed November 10, 1906. Serial No. 342,920.

*To all whom it may concern:*

Be it known that I, BERT C. MAXWELL, a citizen of the United States, residing at Canton, in the county of Stark and State of Ohio, have invented a new and useful Improvement in Account-Cabinets, of which the following is a specification.

This invention relates to a cabinet containing a series of trays for filing bills, as of the current or running accounts of the customers of a retail grocer; and the general objects of the improvement are to so shape the trays that the loose bills cannot slide or be blown therefrom and to so sustain them that the several trays can be lifted upward for freely inserting and removing the bills from the adjacentt ray below, and, furthermore, to so arrange, connect, and sustain the series of trays that they can be removed all together from the cabinet and then collapsed and nested together for storing over night in a vault or fireproof safe. These general objects and other minor ones are attained by the construction and arrangement illustrated in the accompanying drawings, in which—

Figure 1 is a front elevation of the cabinet with two series of trays hung therein; Fig. 2, a vertical section substantially on line 2 2, Fig. 1; Fig. 3, a detached perspective view of two trays, showing the details of construction and support; Fig. 4, a fragmentary sectional view showing the forward end of one tray with the index-card in place; Fig. 5, a detached perspective view of an index-card, and Fig. 6 a detached sectional view showing the manner of collapsing and nesting the trays.

Similar numerals refer to similar parts throughout the drawings.

The cabinet-box 1 is formed deeper at the bottom 2 than at the top 3, so that the forward edges 4 of the sides 5 are inclined downward and forward. The false back 6, preferably made of sheet metal, is provided and preferably has the same inclination as the forward edges of the sides. The tray series, of which two are illustrated in Fig. 1, are sustained from the bridge-board 7, which is arranged to be inserted and supported in the upper part of the box, as by means of the ends 8, entered from the front in the horizontal grooves 9 in the sides of the box. The tray-hangers 10 are made of canvas, chains, or other suitable flexible, contractible, or compressible material and are attached above to the bridge-board, and shorter supports 11, likewise made of canvas, chains, or other suitable flexible, contractible, or compressible material, are severally attached above to the hangers and below to the sides of the individual trays 12. The trays are made of thin stiff material, as of sheet metal, with the rear end 13 bent to incline upward and backward and preferably overlapping the tray above and one part 14 of the forward end extended beyond the other part 15 and the extended part bent upward and forward and then downward and forward in inverted-V-shape form, as at 16. The side extensions 17 are bent upward and slightly outward and may be provided with the flange 18 for attaching the flexible supports, and these side extensions are preferably limited to the middle portion of the tray. The lips 19 and 19[a] are formed or attached substantially at right angles on the free edge of the inverted-V-shape forward end of the tray and serve as a rest for the index-card 20. The lip 19 is furthermore curved and extended forward, and being located near the median line of the tray forms a handle by means of which the forward end of the tray can be lifted. The inturned flanges 21 are provided on the ends of the face side of the inverted-V-shape extension, and the tongue 22 is provided at the upper edge, under which flanges and tongue the index-card 20 is adapted to be held.

The flexible hangers of the tray series are formed to incline downward and forward like the forward edges and false back of the box, and the trays are attached to the flexible hangers by the flexible supports, preferably in a horizontal position, each tray being located slightly forward beyond the tray above so that the lines of the forward and rear ends of the trays have the same inclination as the false back of the box, and the rear ends of the trays will normally rest against the same. The trays are normally spaced apart, so that the apex of the forward extension of one tray is approximately in the line of the bottom of the tray above and in or near below the opening of the inverted-V-shape extension thereof.

When it is desired to insert a bill in a given tray, the forward end of the next tray above is lifted by its handle, so as to make the wide opening 24, through which the bill is readily inserted, and after the raised tray is permitted to drop to its normal position, which it does by its own weight, the inverted-V-shape extension of the tray carrying the bill prevents the same from being accidentally removed therefrom. In raising the front end of a given tray its inverted-V-shaped extension enters and nests in the inverted-V-shaped extension of the tray above, and the same may be also raised by it, as shown more particularly in Fig. 2.

When it is desired to place a tray series in a vault or other fireproof place for safe keeping over night or on holidays, the bridge-board and trays suspended therefrom are removed from the box, after which the series can be collapsed, so that the trays will nest one in another, as shown in Fig. 6, the same being permitted by the flexibility of the hangers and supports and the peculiar shape of the trays, and the series so collapsed can then be stored away in a much smaller place than could otherwise be done. When two or more series of trays are used side by side, it is desirable to have a removable bar 25 in the face of the frame to mark and finish the division between the series, and it will be understood that a single flexible hanger can be used between two adjoining series in place of the two separate hangers illustrated, and it will also be understood that the particular construction of the box and bridge-board and the means for detachably inserting the board in the box are not essential to the other more general features of the cabinet.

In the use of the cabinet it is evident that parts of the forward ends of the bills will extend beyond the short part of the end of the tray, whereby the bills can be grasped for removing, and this part of the top bill in each tray is exposed to view by reason of the tray being located in advance of the one above, and the trays being severally suspended by the flexible supports and the same being located in the middle part thereof the individual trays are thus free to be oscillated on these supports to give easy access between them. It is furthermore evident that the downward-forward inclination of the parts of the cabinet is not essential to the collapsible feature of the tray series and to the freedom of movement of the severally-suspended trays; but this inclination is desirable for the greater convenience thereby resulting in reading the exposed part of the bills and the index-cards. Nor is it essential to the collapsible feature of the tray series that the separate trays be attached by flexible supports to the flexible hangers thereof; but this form of attachment is desirable for the facility given for moving the individual trays upward, and it is also evident that a series of trays severally suspended in a cabinet by independent or individual flexible, contractible, or compressible supports can be used without the hangers described herein when it is not desired to remove the trays from the cabinet or to collapse the series as a whole.

What I claim as my invention, and desire to secure by Letters Patent, is—

1. An account-cabinet comprising a box having a downward-forward inclined back, flexible hangers removably suspended in the box and a series of trays suspended from the hangers by flexible supports, each tray being horizontally located with its forward end in advance of the one above and the rear ends of the trays normally resting against the inclined back.

2. An account-cabinet comprising a box having a downwardly-forward inclined back, flexible hangers removably suspended in the box and a series of trays suspended from the hangers by flexible supports, each tray being located with its forward end in advance of the one above and the rear ends of the trays normally resting against the inclined back.

3. An account-cabinet comprising a box with flexible hangers removably suspended therein and a series of trays suspended from the hangers by flexible supports.

4. An account-cabinet comprising a box having a downward-forward inclined back, flexible hangers removably suspended in the box and a series of trays attached to the hangers, each tray being horizontally located with its forward end in advance of the one above, and the rear ends of the trays normally resting against the inclined back.

5. An account-cabinet comprising a box having a downward-forward inclined back, flexible hangers removably suspended in the box and a series of trays attached to the hangers, each tray being located with its forward end in advance of the one above, and the rear ends of the trays normally resting against the inclined back.

6. An account-cabinet comprising a suitable casing, a series of superposed trays, each tray having individual collapsible supports attached to its side, and means within the casing to which said supports may be attached.

7. In an account-cabinet a series of trays suspended from flexible hangers by flexible supports, there being forward extensions on the trays bent upward and then downward in inverted-V-shape form, the apex of one extension being located approximately in the opening of the extension above.

8. In an account-cabinet a series of trays suspended from flexible hangers by flexible supports, there being forward and rear extensions on each tray inclined upward and outward so as to overlap the tray above.

9. In an account-cabinet a series of trays suspended from flexible hangers by flexible supports, the sides and ends of each tray being inclined outward so as to overlap the tray above.

10. In an account-cabinet a series of trays suspended from flexible hangers by flexible supports, there being upward-outward inclined side extensions on the tray to which the supports are attached.

11. In an account-cabinet a series of trays suspended from flexible hangers by flexible supports attached to the middle parts of the sides of the trays.

12. In an account-cabinet a series of trays suspended from flexible hangers by flexible supports.

13. In an account-cabinet, a series of trays severally suspended by individual collapsible supports, there being forward extensions on the trays bent upward and then downward in inverted-V-shaped form, the apex of one extension being located approximately in the opening of the extension above.

14. In an account-cabinet, a series of trays attached to flexible supports, there being forward and rear extensions on each tray inclined upward and outward so as to overlap the tray above.

15. In an account-cabinet, a series of trays attached to flexible supports, the sides and ends of each tray being inclined outward so as to overlap the tray above.

16. In an account-cabinet, a collapsible series of superposed trays arranged to form a series of compartments, each tray having vertically-inclined walls arranged to overlap the corresponding walls of an adjoining tray, and means connecting the trays together to permit the collapsibility of the series.

17. In an account-cabinet, a series of flexibly-connected superposed trays, each tray having vertically-inclined walls arranged to overlap the corresponding walls of an adjoining tray.

18. In an account-cabinet, a series of superposed trays, each tray having an inclined front wall arranged to nest within the front wall of an adjoining tray, and the bottom of each tray forming a substantial closure for the tray beneath it, and means for tiltably supporting each of said trays in its position in said series.

19. In an account-cabinet, a series of superposed trays, each tray having a vertically-inclined front wall arranged to nest within the front wall of an adjoining tray, and the bottom of each tray forming a substantial closure for the tray beneath it, and flexible supports for each of said trays.

20. In an account-cabinet, a series of superposed trays, each tray having vertically-inclined walls arranged to overlap the corresponding vertically-inclined walls of an adjoining tray and the bottom wall of each tray forming a substantial closure for the tray beneath it, and means for tiltably supporting each of said trays.

21. In an account-cabinet, a series of superposed trays forming a series of compartments, each tray having a bottom wall and a vertically-inclined front wall arranged to overlap the front wall of an adjoining tray, and means for tiltably supporting each of said trays in position in said series to permit the raising and lowering of the front end of each tray relative to the front end of the tray above it.

22. An account-cabinet comprising a collapsible series of superposed trays forming a series of compartments, each tray tiltably supported in working position in said series to permit the raising and lowering of its front end without raising or lowering any other tray in the series.

23. An account-cabinet comprising a series of flexibly-connected superposed trays forming a series of compartments, each tray tiltably supported in said series to permit the raising and lowering of its front end without raising or lowering any other tray in the series.

24. In an account-cabinet, a collapsible series of flexibly-connected tiltably-supported trays arranged to form a series of superposed compartments, each tray having vertically-inclined walls arranged to nest within the corresponding walls of an adjoining tray.

25. In an account-cabinet, a series of flexibly-connected superposed trays, each tray having a bottom wall and a front vertically-inclined wall arranged to overlap the front vertically-inclined wall of an adjoining tray, means for suspending said series in working position, and a downward-forward inclined back wall for the said series of trays.

26. In an account-cabinet, a series of superposed sheet-metal tiltably-supported trays, each tray having a bottom wall and an upwardly and rearwardly extending rear wall, and a stationary back against which the upper edges of said rear walls of the tray are adapted to press.

27. In an account-cabinet, a collapsible series of superposed trays, each tray having a bottom wall and a rear wall arranged to normally overlap the rear wall of the tray above it, and means connecting the trays in series.

28. In an account-cabinet, a series of superposed trays forming a series of compartments, each tray having a bottom wall and a vertically-inclined front wall arranged to nest within the front wall of an adjoining tray, and means for tiltably supporting each of said trays in position in said series with its front wall in a downward-forward inclined plane common to the front walls of all of the trays in the series.

In testimony whereof I have signed my name to this specification in the presence of two subscribing witnesses.

BERT C. MAXWELL

Witnesses:

LUELLA M. CARLIN,

J. B. SNYDER.